United States Patent [19]

Akatsuka et al.

[11] Patent Number: 5,047,754

[45] Date of Patent: Sep. 10, 1991

[54] DISPLAY APPARATUS FOR DISPLAYING A POSITION INDICATING MARK OVER A PLURALITY OF DISPLAY SCREENS

[75] Inventors: Yuichiro Akatsuka; Akira Matsueda; Takefumi Sakurada, all of Tokyo, Japan

[73] Assignee: Olympus Optical Co., Ltd., Tokyo, Japan

[21] Appl. No.: 296,372

[22] Filed: Jan. 10, 1989

[30] Foreign Application Priority Data

Sep. 27, 1985 [JP] Japan .............................. 60-212638
May 14, 1986 [JP] Japan .............................. 61-108622
May 14, 1986 [JP] Japan .............................. 61-109756

[51] Int. Cl.⁵ .................................................. G09G 5/08
[52] U.S. Cl. ........................................ 340/709; 340/710; 340/711; 340/717
[58] Field of Search ............... 340/708, 709, 717, 706, 340/707, 710, 711, 716; 364/200, 900

[56] References Cited

U.S. PATENT DOCUMENTS

| | | | |
|---|---|---|---|
| 3,562,415 | 2/1971 | Michels et al. | 340/709 X |
| 3,648,249 | 3/1972 | Goldsberry | 340/709 X |
| 3,906,197 | 9/1975 | Grover | 340/708 X |
| 4,112,423 | 9/1978 | Bertolasi | 340/717 X |
| 4,302,011 | 11/1981 | Pepper, Jr. | 273/85 G |
| 4,323,891 | 4/1982 | Akashi | 340/709 |
| 4,369,439 | 1/1983 | Broos | 340/710 |
| 4,434,419 | 2/1984 | Couper et al. | 340/717 |
| 4,451,895 | 5/1984 | Sliwkowski | 340/708 X |
| 4,642,789 | 2/1987 | Lavelle | 340/709 X |
| 4,730,186 | 3/1988 | Koga et al. | 340/708 |
| 4,760,387 | 7/1988 | Ishii et al. | 340/717 X |
| 4,760,388 | 7/1988 | Tatsumi et al. | 340/717 |
| 4,761,641 | 8/1988 | Schreiber | 340/717 |
| 4,772,882 | 9/1988 | Mical | 340/709 |

OTHER PUBLICATIONS

Choate et al., *Cases and Materials on Patent Law*; (West Publishing Co., St. Paul, Minn.; 1981; Second Ed.), p. 575.
"RFP-PRC-PTO-11 User Workstation Acquisition"; cover letter and pp. C-1 through C-61; Planning Research Corp. (McLean, Va.); date is not later than Mar. 4, 1985.
"Automating the U.S. Patent and Trademark Office"; Planning Research Corporation; not dated.
IBM Technical Disclosure Bulletin, vol. 26, No. 7B, Dec. 1983, "Graphic Input Device Combining Functions of Selector and Locator".

*Primary Examiner*—Bernarr E. Gregory
*Attorney, Agent, or Firm*—Parkhurst, Wendel & Rossi

[57] ABSTRACT

A display apparatus for displaying a cursor over a plurality of display screens including a plurality of display units each having respective display screens, a mouse for generating relative coordinates of the cursor on a display screen, and a signal processing unit for receiving the relative coordinates generated by the mouse and automatically determining a display screen on which the cursor is to be displayed. By moving the mouse continuously, the cursor is removed from one display screen to a next display screen in a continuous manner. Particular positions on a plurality of display screens can be simultaneously denoted from any one of the display screens.

6 Claims, 9 Drawing Sheets

FIG_1 PRIOR ART
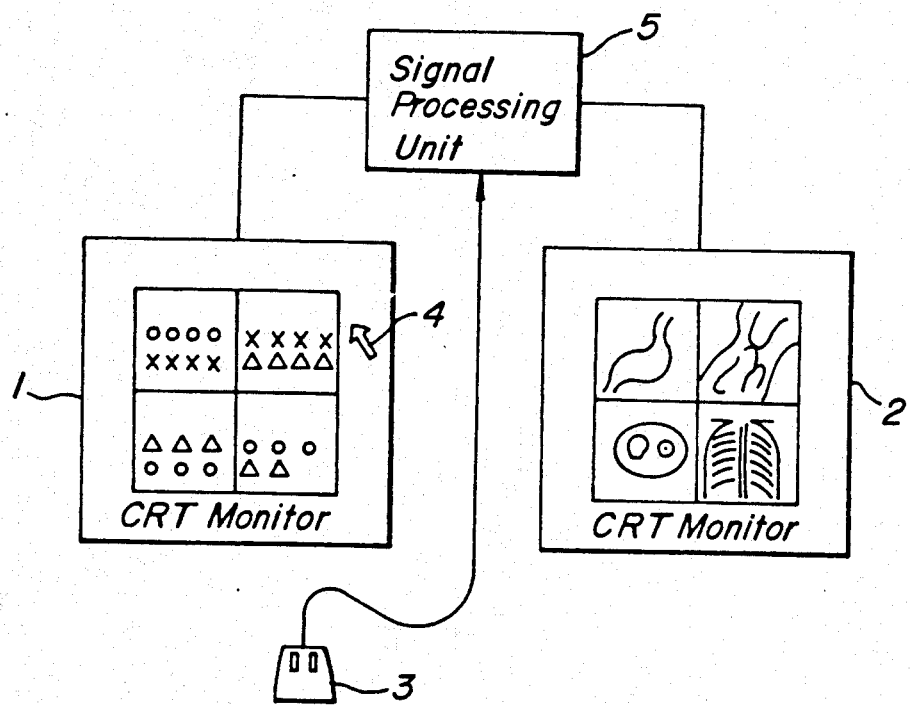
FIG_2 PRIOR ART
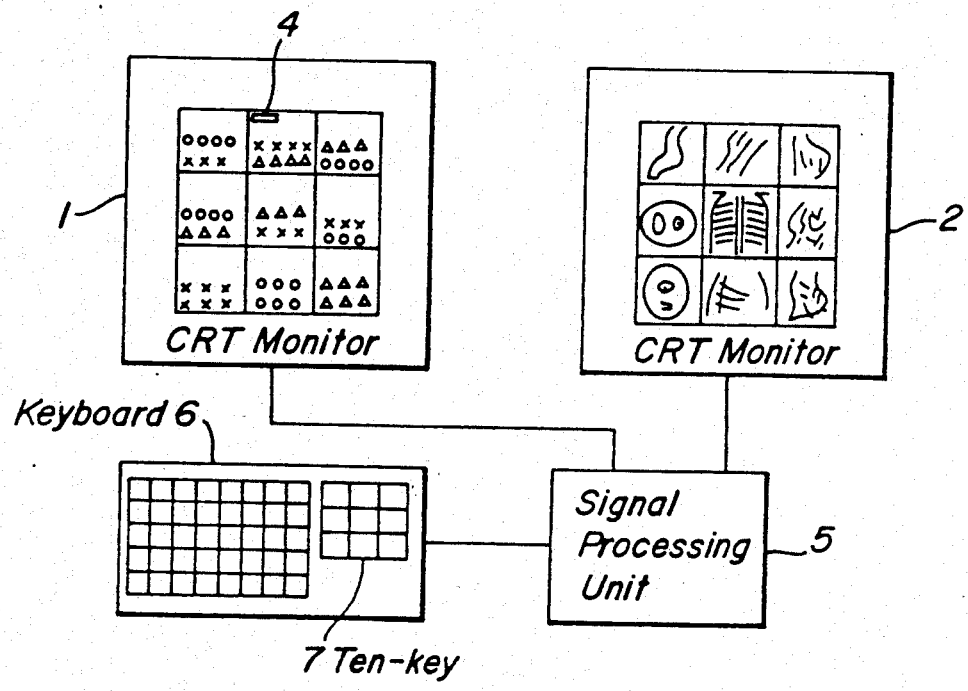

DISPLAY APPARATUS FOR DISPLAYING A POSITION INDICATING MARK OVER A PLURALITY OF DISPLAY SCREENS

This is a continuation of application Ser. No. 06/906,905 filed Sep. 15, 1986, now abandoned.

BACKGROUND OF THE INVENTION

Field of the Invention and Related Art Statements

The present invention relates to a display apparatus comprising a plurality of display units having display screens over which a position indicating mark can be displayed.

There has been known a display apparatus comprising a plurality of display units having display screens. For instance in, a medical image filing system, there are provided two display units, one for displaying various kinds of medical picture images such as X-ray images, CT-images, ultrasonic images, NMR images and endoscopic images, and the other for displaying various kinds of attribute data relating to picture images such as patient name, doctor name, imaged part of body, imaging date and diagnosed result.

In the display apparatus mentioned above, in order to denote or enter coordinates of a particular position or area of a displayed image, there are provided a plurality of coordinate input units for a plurality of display units. In such an apparatus, a position indicating mark, i.e. cursor, is displayed on a display screen of a respective display unit. The cursor can be moved at will on a respective display unit with the aid of a respective coordinate input unit, and after the cursor has been moved into a desired position, when a switch provided in the coordinate input unit is actuated, coordinates of the relevant position are generated and entered in a signal processing unit.

Further, it has been also known to provide a single coordinate input unit and a switching unit for selecting a display screen on which a cursor is to be displayed. By manually operating the switching unit, it is possible to enter coordinates of a desired position on a desired display screen.

In the above explained display apparatuses, the coordinate input unit may be formed by an absolute coordinate input device such as tablet, touchpanel or light-pen or by a relative coordinate input device such as trackball, mouse or digitizer.

In the case of providing a plurality of coordinate input units, a whole system becomes large in size and expensive in cost. Further, since an operator has to handle a plurality of coordinate input units selectively, the operation becomes quite cumbersome.

In the case of using the single coordinate input unit, since the operator is required to handle the switching unit manually for denoting a desired display unit on which the position indicating mark is to be displayed, the operation is still cumbersome.

In the above mentioned medical image filing system, for the sake of a simple retrieval, a plurality of reduced picture images and their attribute data are grouped into a picture image list and an attribute data list, respectively and these lists are displayed on the respective display screens as menu images. After any desired picture image has been denoted by moving the cursor into a position related to said picture image, coordinates of the relevant position are entered into the signal processing unit to select a full size picture image corresponding to the selected picture image and the selected full size picture image instead of the picture image list is displayed on the display screen.

FIG. 1 is a schematic view showing the known medical image filing system including first CRT monitor 1, second CRT monitor 2, mouse 3 for inputting coordinates of a position indicating mark, i.e. cursor 4, and a signal processing unit 5 connected to the monitors 1, 2 and mouse 3. As shown in FIG. 1, on the CRT monitor 1, there is displayed a list of attribute data relating to a plurality of picture images included in a picture image list which is displayed on the second CRT monitor 2. The cursor 4 is displayed only on the first CRT monitor 1 and can be moved on a display screen of this CRT monitor 1 by moving the mouse 3 on a table not shown. The operator looks at the displayed images on the CRT monitors 1 and 2 and determines a picture image to be displayed on the second CRT monitor 2 at an enlarged scale. Then the operator moves the mouse 3 to bring the cursor 4 to a display area on which the attribute data belonging to said selected picture image is displayed and pushes a switch on the mouse 3. Then the signal processing unit 5 detects a coordinate-position of the cursor 4 on the screen of the CRT monitor 1 to detect the picture image which has been selected by the operator. Then a picture image signal relating to the selected picture image is read out of a picture image file provided in the signal processing unit 5 and the relevant picture image of full scale is displayed on the second CRT monitor 2. At the same time, the attribute data list is also replaced by new detailed attribute data belonging to the relevant picture image.

FIG. 2 is a schematic view illustrating another known medical image filing system which comprises a keyboard 6 instead of the mouse for entering the coordinate-position. By operating a ten-key 7 provided on the keyboard 6, it is possible to select one of a plurality of reduced picture images simultaneously displayed on the CRT monitor 2 whose attribute data list is also displayed on the first CRT monitor 1. Then a selected full scale picture image and its detailed attribute data are displayed on the CRT monitors 2 and 1, respectively.

As explained above, in the known image filing system, the operator can enter a coordinate-position for the image retrieval only from the attribute data displaying CRT monitor 1, and this is sometimes inconvenient and thus the known system can not provide a versatile user interface. As explained above, it may be possible to indicate particular picture image and its attribute data from any of the two CRT monitors, if the cursor 4 may be selectively displayed on a selected monitor. However, in such a case, the operation becomes cumbersome. Moreover, such a system could not be used when the number of picture images contained in a list, i.e. menu image, is changed.

Due to the recent progress in imaging devices, the resolution of the image has improved. In such a case, it is desirable to display the picture images on the CRT screen having a large screen area and a high resolution, whereas the attribute data composed of characters is sufficient to be displayed on a usual CRT monitor. Because, display ranges of CRT monitors are different from one another, it is impossible to move the cursor in a similar manner on these monitors. For instance, there might be produced an area in which the cursor could not be moved.

SUMMARY OF THE INVENTION

The present invention has for its object to provide a novel and useful display apparatus comprising a plurality of display units and a single unit for entering coordinates of a position indicating mark over these display units by means of a simple operation.

It is another object of the invention to provide a display apparatus comprising a first monitor for displaying picture images and a second monitor for displaying attribute data related to the picture images, in which any coordinate position on display screens of the monitors can be entered or denoted from either the first or second monitors with the aid of a single coordinate input unit.

It is still another object of the invention to provide a display apparatus comprising a plurality of display units having different size and/or resolution, in which a cursor can be conveniently and easily moved over whole display screens of a plurality of display units.

According to the invention, a display apparatus for displaying a position indicating mark over a plurality of display screens comprises:

a plurality of display units, each having a display screen;

a coordinate input unit for entering coordinates of a current position of a position indicating mark to be displayed on a display screen; and a signal processing unit coupled with said display units and coordinate input unit for selecting automatically a display unit to which said coordinates entered by said coordinate input unit belong and for displaying the position indicating mark on the selected display unit.

BRIEF DESCRIPTION OF THE DRAWINGS

FIGS. 1 and 2 are schematic block diagrams showing known display apparatuses;

DESCRIPTION OF THE PREFERRED EMBODIMENTS

Figure 3:
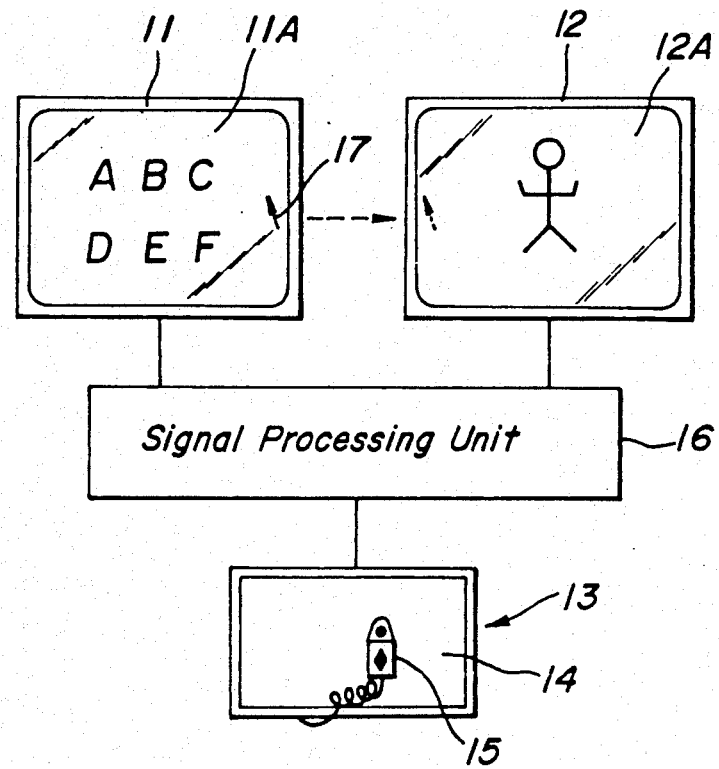
FIG. 3 is a schematic block diagram illustrating one embodiment of the display apparatus according to the invention.
Figure 4:
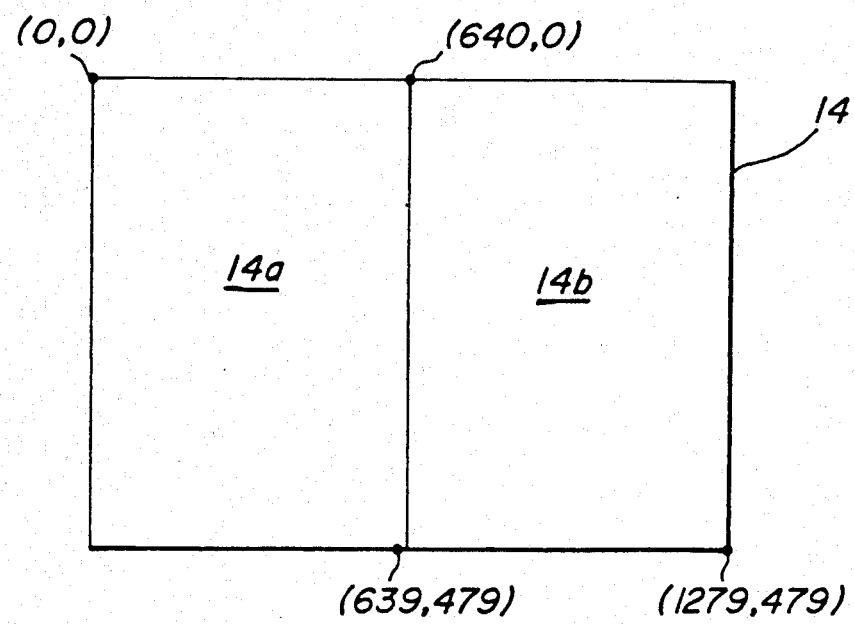
FIG. 4 is a schematic view depicting a coordinate area of a coordinate input unit of the apparatus shown in FIG. 3.

FIG. 3 is a schematic view showing an embodiment of the display apparatus according to the invention. The apparatus comprises first and second display units 11 and 12 having display screens 11A and 12A, respectively, a single coordinate input unit 13 including a coordinate sheet 14 and a coordinate pointer 15 which is moved on the sheet, and a signal processing unit 16 coupled with the display units 11, 12 and coordinate input unit 13. In the present embodiment, a coordinate input area of the coordinate input sheet 14 is divided into two sub-areas 14a and 14b having the same dimension as illustrated in FIG. 4. For instance, when each of the display units 11 and 12 has a display area of 640×480 pixels, a total coordinate input area of the coordinate input sheet 14 should have a dimension of 1,280×480 coordinate-positions. Among these coordinate-positions, the sub-area 14a of (0, 0) to (639, 479) is alloted to the display screen 11A of the first display unit 11 and the remaining sub-area 14b of (640, 0)—(1,279, 479) is allotted to the display screen 12A of the second display unit 12. Then the signal processing unit 16 can judge or select automatically a display unit to which a current coordinate-position entered by the pointer 15 belongs. For instance, if a coordinate-position entered by the pointer 15 is (465, 280), the signal processing unit 16 recognizes that the entered coordinate-position belongs to the first display unit 11 and a position indicating mark, i.e. cursor 17, is displayed on the screen 11A of the first display unit 11. When a coordinate-postion entered by the coordinate input unit 13 is (835, 280), the signal processing unit 16 judges that the relevant coordinate position belongs to the second display unit 12 and the cursor 17 is displayed on the screen 12A of the second display unit 12.

Figure 5:
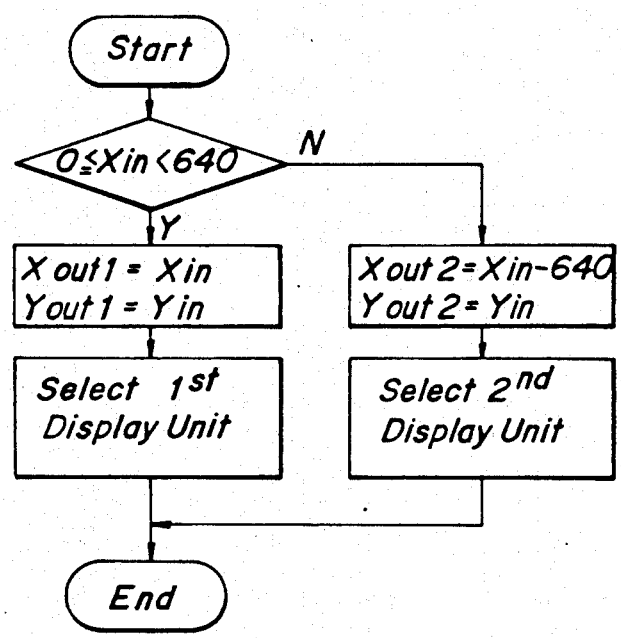
FIG. 5 is a flow chart representing an operation of the display apparatus shown in FIG. 3.

Now the operation of the signal processing unit 16 will be explained with reference to the flow chart shown in FIG. 5. Input coordinates entered by the coordinate input unit 13 are denoted by ($X_{in}$, $Y_{in}$), and output coordinates for the first and second display units 11 and 12 are represented as ($X_{out}$ 1; $Y_{out}$ 1) and ($X_{out}$ 2, $Y_{out}$ 2), respectively. First the signal processing unit 16 judges whether the input horizontal coordinate $X_{in}$ is larger than or equal to 0 and smaller than 640 ($0 \leq X_{in} < 640$). If $X_{in}$ is smaller than 640, the signal processing unit 16 supplies $X_{out} 1 = X_{in}$, $Y_{out} 1 = Y_{in}$ to the first display unit 11. If $X_{in}$ is larger than or equal to 640, the signal processing unit 16 sends $X_{out} 2 = X_{in} - 640$, $Y_{out} 2 = Y_{in}$ to the second display unit 12.

While the cursor 17 is displayed at a position near a right-hand side of the first display screen 11A, when the pointer 15 is moved further rightward, the cursor 17 is removed from the screen 11A of the first display unit 11 into a left-hand side of the screen 12A of the second display unit 12. In this manner, the cursor 17 can be moved over the screens 11A and 12A of the first and second display units 11 and 12 in a continuous manner by means of the single coordinate input unit 13.

Figure 6:
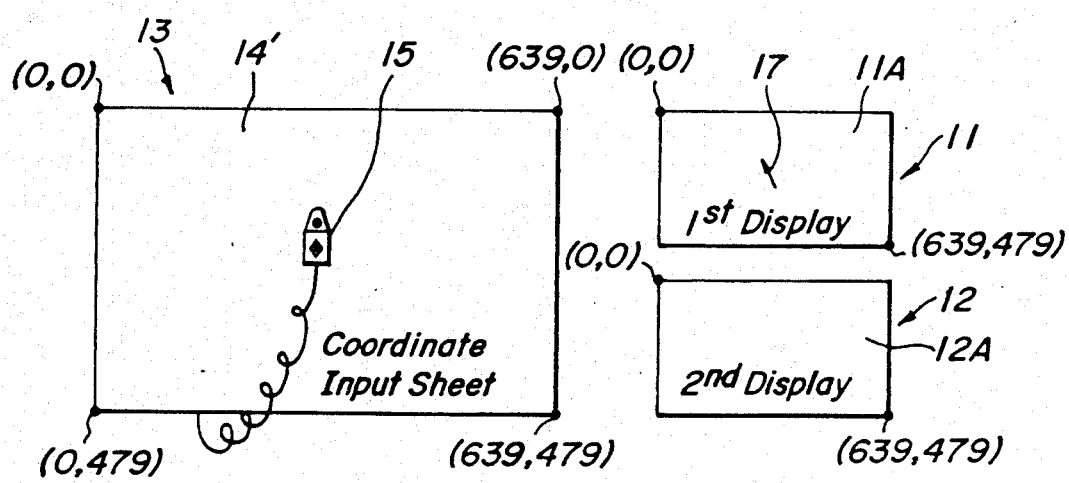
FIG. 6 is a schematic block diagram illustrating another embodiment of the display apparatus according to the invention.

FIG. 6 is a schematic view showing another embodiment of the display apparatus according to the invention. In the above mentioned embodiment, the coordinate input sheet 14 has a large area which covers both the screens of the first and second display units. In the present embodiment, the coordinate input unit 13 comprises a coordinate input sheet 14' having a dimension equal to that of the screens 11A and 12A. In order to select automatically one of the screens on which the cursor 17 is to be displayed, use is made of coordinates on right-hand and left-hand sides. The coordinate input sheet 14' has an area of (0, 0) to (639, 479), while each of the display screens 11A and 12A also has the same area of (0, 0) to (639, 479). The cursor 17 can be moved in the display screen 11A or 12A by moving the coordinate input pointer 15 on the coordinate input sheet 14'. When the cursor comes on a right-hand or left-hand side of the screen, the cursor is removed from one display screen to the other display screen.

Figure 7:
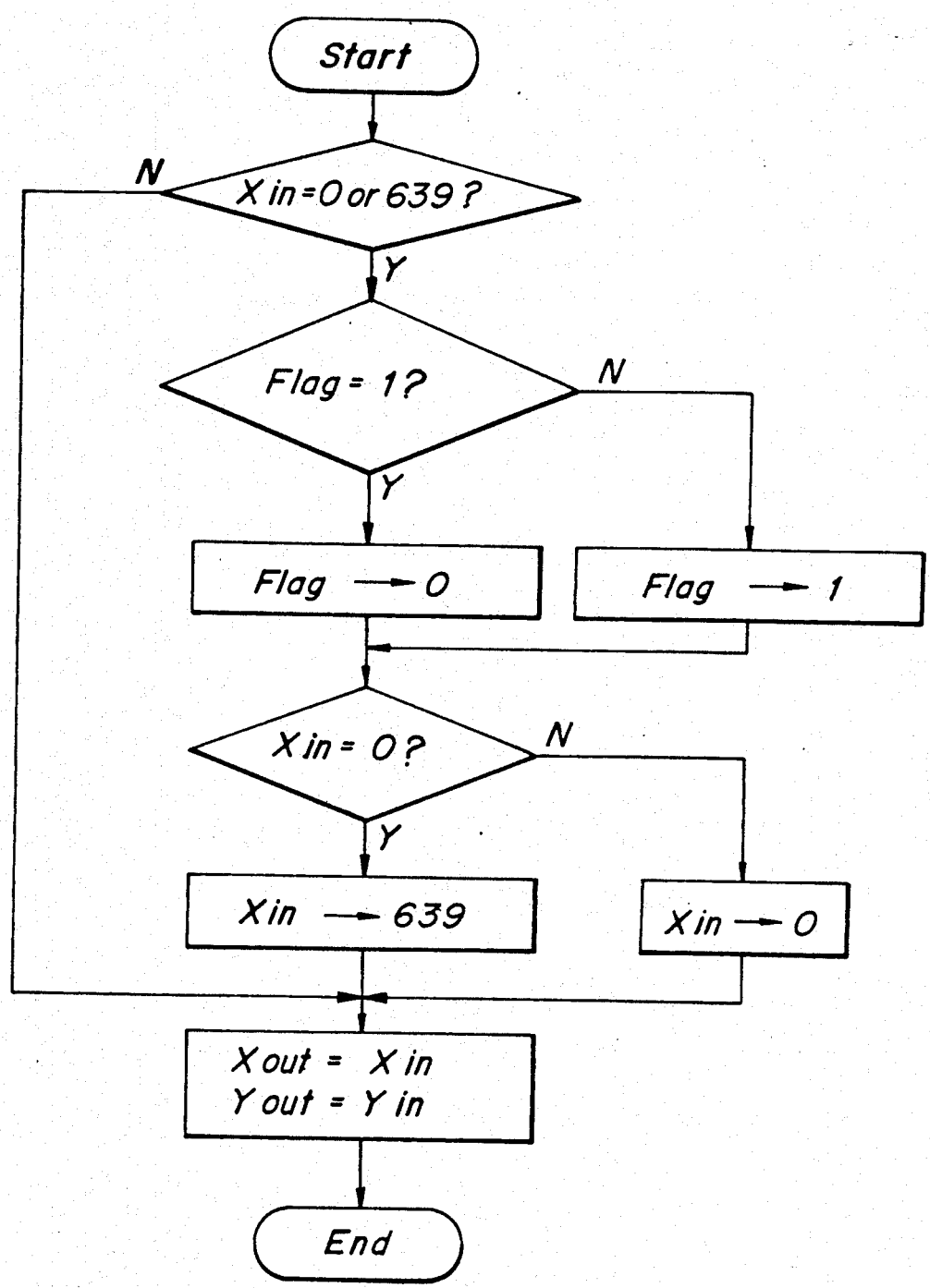
FIG. 7 is a flow chart representing an operation of the display apparatus shown in FIG. 6.

FIG. 7 is a flow chart explaining the operation of signal processing unit in the present embodiment. In the present embodiment, there is provided a display flag in data processed by the signal processing unit. The display flag of 0 is denoted for the first display unit 11 and the display flag of 1 is allotted to the second display unit 12. In an initial condition, the display flag of 0 is set and the cursor 17 is displayed on the first display screen 11A at a position related to a position at which the pointer 15 is occasionally placed on the coordinate input sheet 14'. The horizontal coordinate $X_{in}$ entered by the coordinate input unit 13 is always compared with 0 and 639. When $X_{in} \neq 0$ and $X_{in} \neq 639$, the signal processing unit supplies $X_{out} = X_{in}$, $Y_{out} = Y_{in}$ to the first display unit 11. When $X_{in} = 0$ or $X_{in} = 639$ is detected, it is then judged whether or not the relevant display flag is equal to 1. If the flag is not equal to 1, the flag is changed to 1, while if the flag is equal to 1, it is changed to 0. Next, it is further judged whether $X_{in} = 0$ or not. If $X_{in} = 0$, $X_{in}$ is changed to 639, but if $X_{in} \neq 0$, $X_{in}$ is changed to 0. Then the horizontal coordinate thus changed is supplied to the first or second display unit together with the vertical coordinate $Y_{out} = Y_{in}$. After that, input coordinates are supplied to the first or second display unit ($X_{out} = X_{in}$, $Y_{out} = Y_{in}$).

Figure 8:
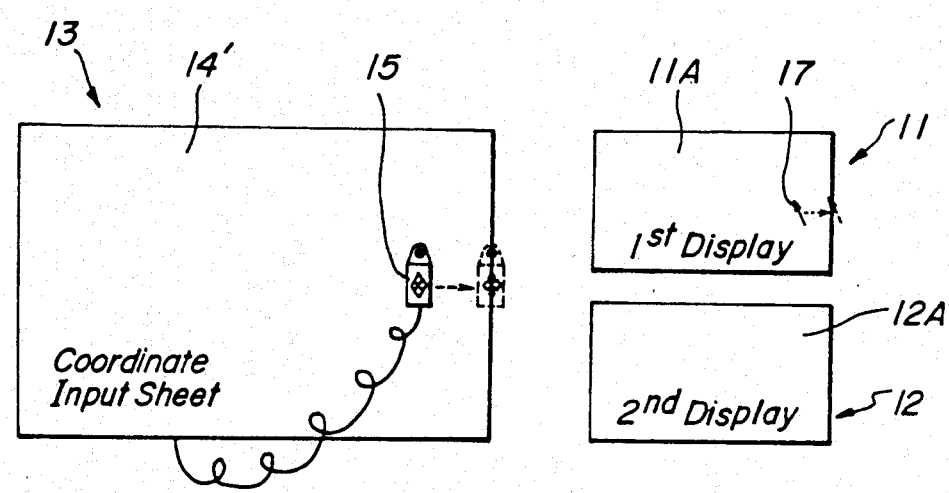
FIGS. 8 and 9 are schematic views showing the movement of a cursor.
Figure 9:
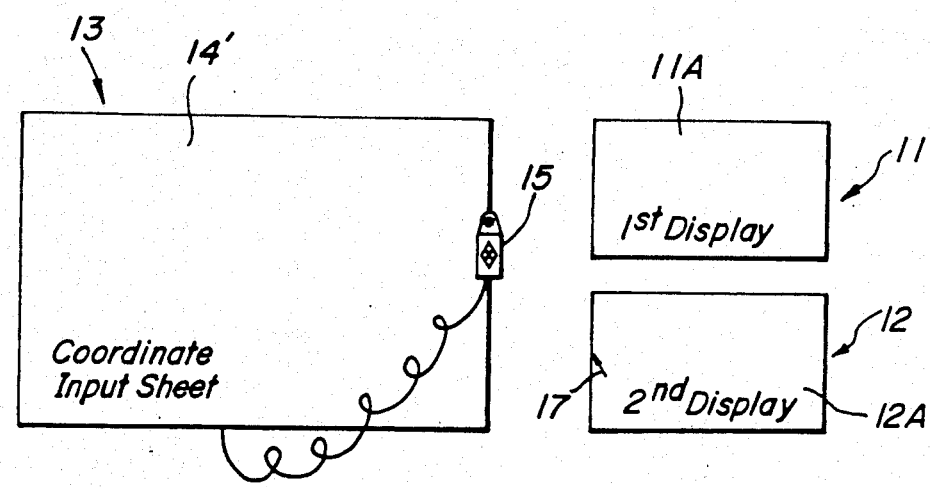

As shown in FIG. 8, when the cursor 17 is displayed on the first display screen 11A (flag=0), and the pointer 15 is moved rightward up to the right-hand side of the coordinate input sheet 14', the cursor 17 is also moved rightward up to the right-hand side of the screen 11A. Then, the cursor 17 is removed from the first display screen 11A into the left-hand side of the second display screen 12A as illustrated in FIG. 9. When the pointer 15 is moved on the coordinate input sheet 14', the cursor 17 is moved on the second display screen 12A accordingly.

While the cursor 17 is displayed on the first display screen 11A, when the cursor is moved into the left-hand side of the screen 11A, the cursor is removed from the first display screen 11A to the right-hand side of the second display screen 12A. While the cursor 17 is displayed on the second display screen 12A, when the cursor is moved into the left-hand side or right-hand side of the second display screen, the cursor is removed from the second display screen into the right-hand side or left-hand side of the first display screen 11A, respectively.

In the manner explained above, in the present embodiment, the first and second display units 11 and 12 are automatically selected by indicating the right-hand and left-hand sides of the coordinate input sheet 14' with the aid of the pointer 15. If the absolute coordinate input unit 13 is replaced by a relative coordinate input unit such as tackball and mouse, the cursor can be moved completely continuously over the first and second display screens, as in the first embodiment shown in FIG. 3. Moreover, if the two display screens are arranged one above the other instead of side by side, upper and lower sides may be utilized instead of the right-hand and left-hand sides.

Figure 10:
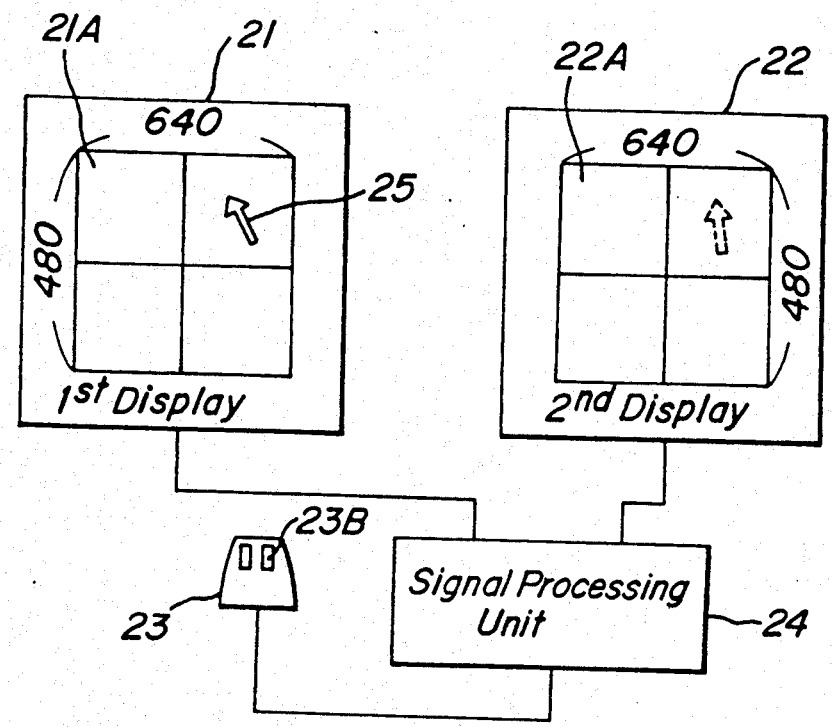
FIG. 10 is a schematic block diagram depicting another embodiment of the display apparatus according to the invention.

FIG. 10 is a schematic view illustrating another embodiment of the display apparatus according to the invention. In the present embodiment, there are provided a first display unit 21 having a display screen 21A for displaying attribute data, a second display unit 22 having a display screen 22A for displaying picture images, a coordinate input unit 23 comprising a mouse, and a signal processing unit 24 coupled with the first and second display units 21, 22 and mouse 23. Also in the present embodiment, by moving the mouse 23 on a table, it is possible to move a cursor 25 over the display screens 21A and 22A. Therefore, any desired picture image among a picture image list containing a plurality of reduced picture images and displayed on the screen 22A can be denoted from either the attribute data list or the picture image list. Further, when a part of the picture image list is changed, a picture image to be replaced by another picture image can be denoted either from the attribute data list or the picture image list. In this manner, according to the present invention, the position denoting operation becomes very easy and versatile.

Figure 11:
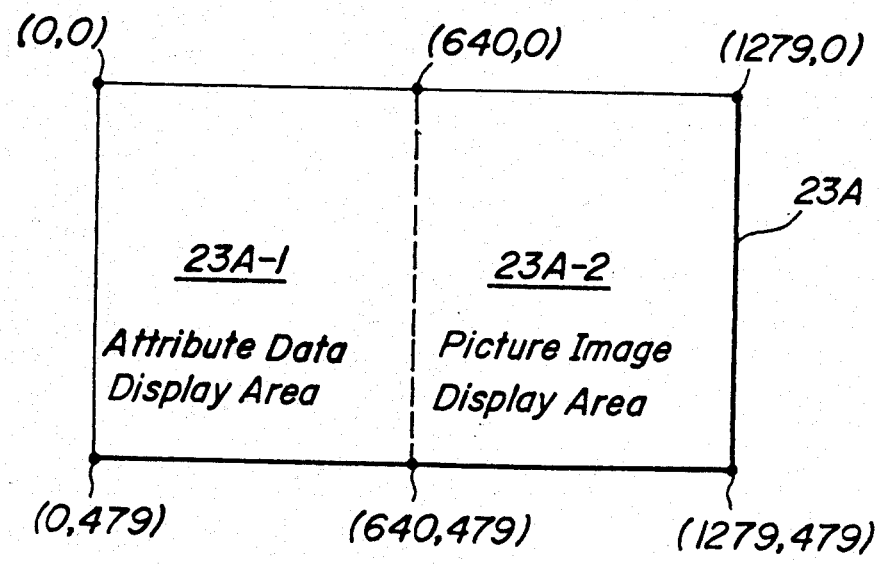
FIG. 11 is a schematic view illustrating a construction of the display area of the display apparatus shown in FIG. 10.

FIG. 11 illustrates an imaginary coordinate area relating to the mouse 23. If it is now assumed that each of the first and second display screens 21A and 22A has a dimension of 640×480 pixels, then the coordinate area 23A of the mouse 23 has a dimension of (0, 0)–(1,279, 479), among which a sub-area 23A-1 of (0, 0)–(639, 479) is allotted to the attribute data display screen 21A and a sub-area 23A-2 of (640, 0)–(1,279, 479) to the picture image display screen 22A.

As has been explained with reference to the first embodiment shown in FIG. 3, when a horizontal coordinate $X_{in}$ entered by the mouse 23 is larger than or equal to 0 and smaller than 640 ($0 \leq X_{in} < 640$), the central processing unit 24 supplies the coordinates of $X_{out} = X_{in}$, $Y_{out} = Y_{in}$ to the first display unit 21. If $640 \leq X_{in} < 1,279$, the central processing unit 24 sends coordinates of $X_{out} = X_{in} - 640$, $Y_{out} = Y_{in}$ to the second display unit 22. In this manner, the cursor 25 can be moved continuously over the first and second display screens 21A and 22A by means of the single mouse 23. After the cursor 25 has been moved into a desired position on the first or second display screen, when a push button 23B on the mouse 23 is actuated, the coordinates at this instance are entered in the signal processing unit 24 as denoted coordinates. Then the signal processing unit 24 sends a command for displaying a picture image corresponding to a picture image in the picture image list indicated by the cursor 25 on the second display screen 22A and at the same time attribute data related to the relevant picture image is displayed on the first display screen 21A.

Figure 12:
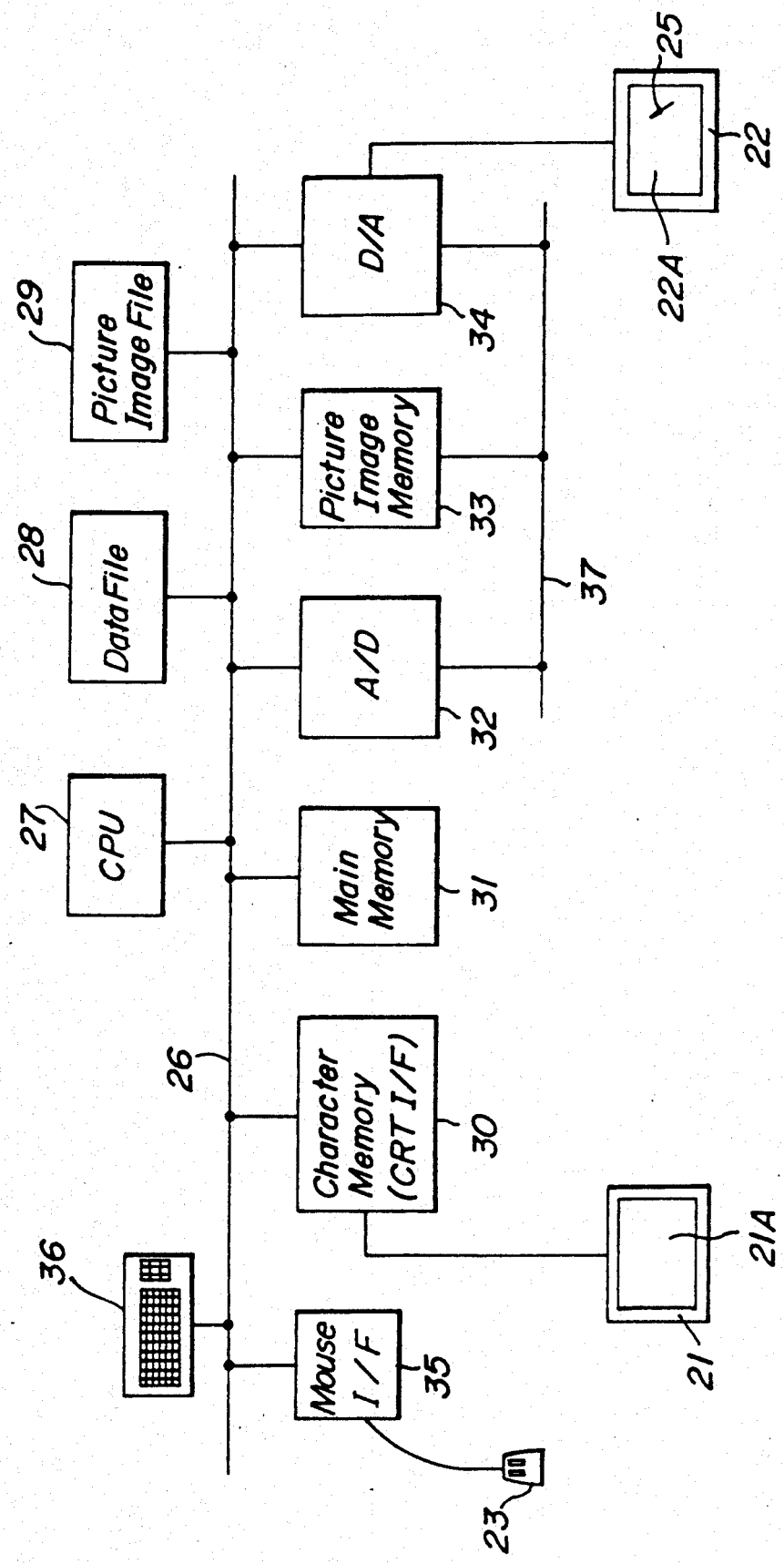
FIG. 12 is a block diagram showing a detailed construction of the display apparatus of FIG. 10.

FIG. 12 is a block diagram showing a detailed construction of the display apparatus. To a CPU bus 26 are coupled CPU 27, data file 28, picture image file 29, character displaying memory (CRT I/F) 30, main memory 31, A/D converter 32, picture image memory 33, D/A converter 34, mouse interface 35 and keyboard 36. The data file 28 stores the attribute data and directory of picture image data. The picture image file 29 stores picture images of full size (640×640) and reduced picture images of half size (320×320) for the picture image list. To the character displaying memory 30 is coupled the first display unit 21, and when the attribute data is written in the character displaying memory 30 under the control of the CPU 27, the display unit 21 displays the attribute data. The main memory 31 stores the software and attribute data. To the A/D converter 32, picture image memory 33 and D/A converter 34 is connected a picture image bus 37 by which the picture image signal is supplied from the A/D converter 32 to the picture image memory 33 and the picture image signal is read-out of the main memory 33 to the D/A converter 34. The analog picture image signal supplied from the D/A converter 34 is supplied to the second display unit 22.

Now the operation for displaying a picture image list and displaying a picture image selected from the picture image list will be explained. At first, an operator enters a file name corresponding to a desired picture image list with the aid of the keyboard 36. Then CPU 27 selects an attribute file related to the entered file name from the data file 28 and is read-out into the main memory 31. The attribute file contains an attribute data list of the relevant picture image list (including four reduced picture images), address information of the relevant image file in the picture image file 29, and address information of the four full size picture images in the picture image file 29. A part of the attribute data in a given format is written in the character displaying memory 30 under the control of CPU 27. The attribute data may contain patient name, date of imaging, part of body, doctor name, diagnosis, etc.

Next, CPU 27 sends an address of the picture image list to the picture image file 29 and data of the picture image list in a given format is read-out into the picture image memory 33. The D/A converter 34 reads out the picture image data from the picture image memory 33 in synchronism with the scanning at the second display unit 22, and converts the read-out data into an analog signal which is then displayed on the display screen 22A of the second display unit 22. In this manner, the attribute data and the picture image lists are displayed on the first and second display screens 21A and 22A, respectively. At the same time, the cursor 25 is displayed at a position denoted by the coordinates generated by the mouse 23.

The operator looks at the display screens 21A and 22A and determines a picture image in the picture image list. At first, it is assumed that the picture image is denoted from the attribute data list displayed on the first display screen 21A. In this case, the cursor 25 is moved into a desired position on the first display screen 21A by moving the mouse 23 on the table and then the push button on the mouse 23 is actuated. When the picture image list contains four picture images, as illustrated in FIG. 10, the display screen is divided into four sub-areas of (0, 0)–(319, 239), (320, 0)–(639, 239), (0, 240)–(319, 479) and (320, 240)–(639, 479).

Now it is assumed that the cursor coordinates denoted by the mouse 23 are (480, 360), CPU 27 can judge that attribute data displayed on a right upper sub-area is selected. Then CPU 27 reads out an address of a full size picture image relating to the relevant attribute data from the main memory 31 and sends the read-out address to the picture image file 29. Picture image data of the relevant picture image having a full size of 640×480 is read-out from the picture image file 29 into the picture image memory 33. In this manner, the full size picture image is displayed on the second display screen 22A. At the same time, all attribute data relating to the relevant picture image is displayed on the first display screen 21A.

According to the invention, it is also possible to denote a desired picture image from the picture image list displayed on the second display screen 22A. In this case, the cursor 25 is moved into the second display screen 22A by moving the mouse 23. The four picture images are displayed in four sub-areas of (640, 0)–(959, 479), (960, 0)–(1,279, 239), (640, 240)–(959, 479) and (690, 240)–(1,279, 479).

It is assumed that the cursor 25 is positioned at coordinates (900, 400). Then CPU 27 can judge that a picture image at the left and lower area is denoted by the mouse 23. In a similar manner to that explained above, an address of a selected picture image in the picture image file 29 is read-out of the main memory 31 and is sent to the picture image file 29 and the relevant picture image of full size of 640×480 pixels is displayed on the second display screen 22A. At the same time, detailed attribute data of the relevant picture image is displayed on the first display screen 21A.

As explained above, in the present embodiment, the cursor 25 can be moved completely continuously over the first and second display screens 21A and 22A only by moving the mouse 23 on the table. Then, any desired picture image contained in the picture image list can be easily denoted from both the attribute data list and picture image list displayed on the first and second display screens 21A and 22A, respectively. Therefore, the operator can effect the retrieval in a simple and positive manner, so that there can be provided a versatile user interface. Moreover, since an amount of movement of the mouse 23 can be controlled continuously to move the cursor 25 into any desired position on the screen, even if in the number of divided sub-areas, i.e. reduced picture images in a picture image list, it is equally possible to denote any desired picture image in the list. Thus, the construction of the picture image list can be selected at will.

In the above explanation, it is assumed that all the picture images can be included in the single picture image list. However, if a large number of images are stored in the picture image file, it is practically impossible to include all the picture images in the single list. For instance, when there are stored eight picture images in the picture image file, while the second display unit 22 can display only one picture image list including four reduced picture images of 320×240 pixels. In such a case, one of the four reduced picture images in the list has to be selectively replaced by a new reduced picture image. According to the present embodiment, such a replacement of reduced picture images in the list can be denoted from both the attribute data list and picture image list. For instance, after the cursor 25 has been moved into any desired sub-area of the display screen 21A or 22A by moving the mouse 23 when a push button on the mouse 23 is actuated, a reduced picture image relating to the denoted sub-area is erased. Then the operator actuates a predetermined function key to display a new reduced picture image in the relevant sub-area to form a new picture image list. It should be noted that the attribute data in the relevant sub-area is also replaced by new attribute data relating to the newly displayed reduced picture image.

In the embodiments so far explained, the two display screens have the same dimensions, i.e. the same number of pixels. In the medical image filing system, the attribute data is displayed as characters, so that the display screen for displaying the attribute data need not have as high as resolution as that required for displaying the picture image. Then the first and second displaying screens should have different dimensions. For instance, the first display screen has a dimension of 640×400 pixels and the second display screen has a dimension of 640×480 pixels. According to the invention, the cursor may be moved over a plurality of display screens having different dimensions without causing any difficulty for the operator. Such an embodiment will be explained hereinbelow.

Figure 13:
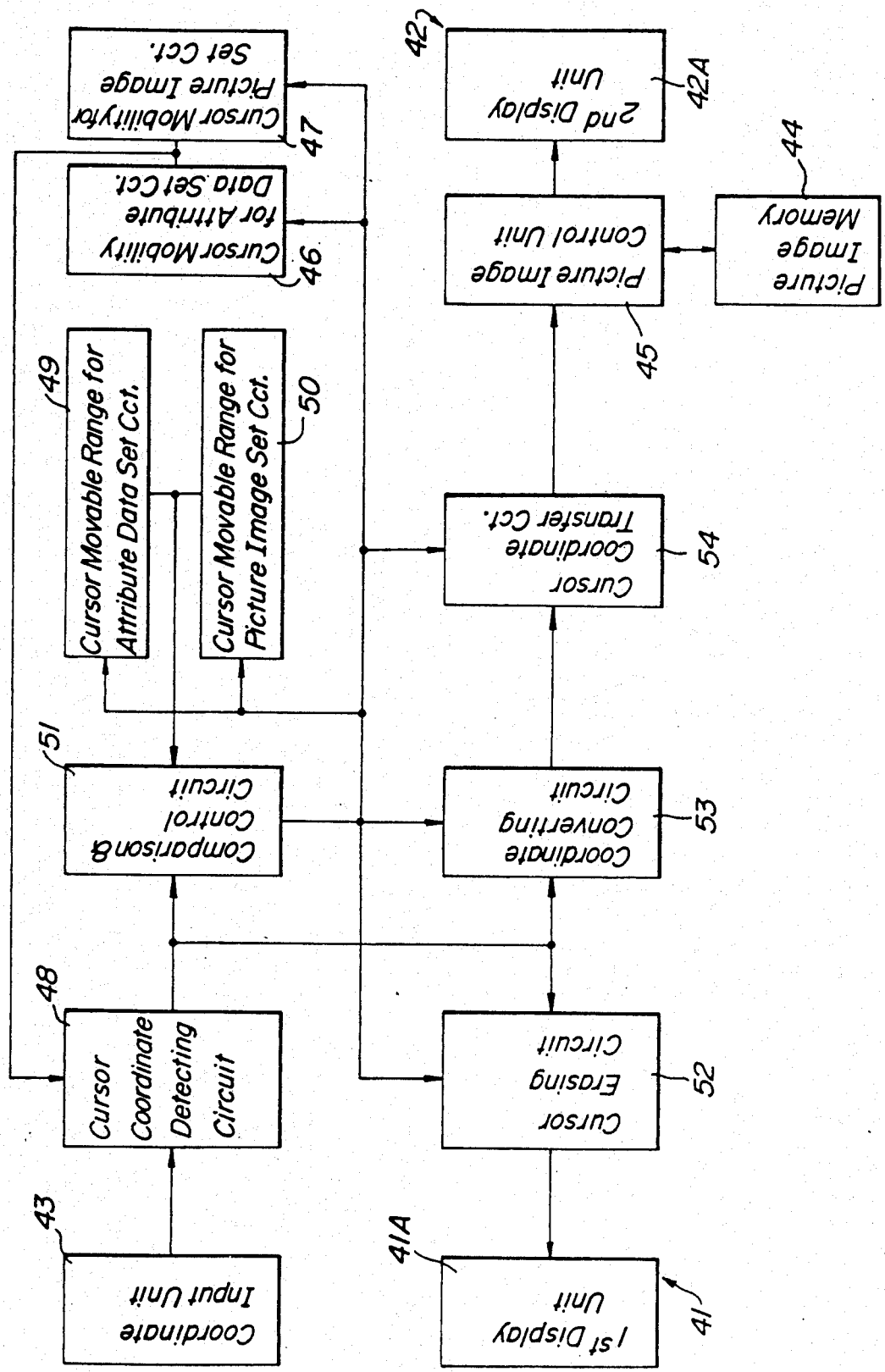
FIG. 13 is a block diagram depicting still another embodiment of the display apparatus according to the invention.

FIG. 13 is a block diagram illustrating still another embodiment of the display apparatus according to the invention. The apparatus comprises first display unit 41 having a display screen 41A for displaying attribute data, second display unit 42 having a display screen 42A for displaying picture images, coordinate input unit 43 such as a mouse, picture image memory 44 for storing full scale picture images and reduced picture images, and picture image control unit 45 coupled with the second display unit 42 and picture image memory 44. There are further provided a circuit 46 for setting a ratio of a distance over which the mouse 43 is moved to a distance over which the cursor is moved on the first display screen 41A for displaying the attribute data (hereinafter said ratio is termed as a cursor mobility for attribute data), and a circuit 47 for setting a ratio of a distance over which the mouse 43 is moved to a distance over which the cursor is moved on the second display screen 42A for displaying the picture image (said ratio is called a cursor mobility for picture image). Said cursor mobilities can be entered into a central processing unit (not shown) with the aid a keyboard (also not shown). A cursor coordinate detecting circuit 48 receives the moving distance data from the mouse 43 and the cursor mobility data from the cursor mobility setting circuit 46 or 47, and detects a current cursor position on the display screen 41A or 42A. There are further provided a circuit 49 for setting a movable range of the cursor in the attribute data display screen 41A, and a circuit 50 for setting a movable range of the cursor in the picture image display screen 42A. The movable range of the cursor is entered in these circuits 49, 50 with the aid of the keyboard. The apparatus further comprises a comparison and control circuit 51 which compares the cursor coordinates from the cursor coordinate detecting circuit 48 and the cursor movable range from the cursor movable range setting circuit 49 or 50 with each other and determines a position of the cursor on the first or second display screen 41A or 42A. At the same time, the comparison and control circuit 51 sends selection commands to the cursor mobility setting circuits 46, 47 and the cursor movable range setting circuits 49, 50 so that these circuits are selectively connected to the cursor coordinate detecting circuit 48 in accordance with the selected display unit 41 or 42. The comparison and control circuit 51 also controls a cursor erasing circuit 52 for erasing the cursor when the cursor is to be displayed on the second display screen 42A, a circuit 52 for converting the coordinates of the cursor into coordinates which are suitable for the second display screen 42A, when the second display unit 42 is selected. Said conversion is carried out in accordance with a coefficient which is entered into CPU with the aid of the keyboard. The apparatus further comprises a circuit 54 for transferring the coordinate data of the cursor to the picture image control unit 45 only when the second display unit 42 is selected.

Figure 14:
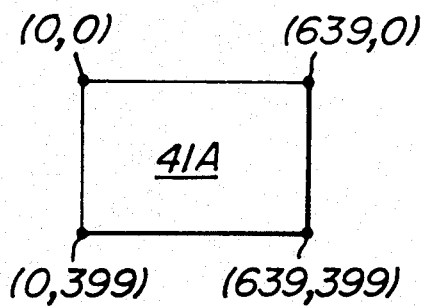
FIGS. 14, 15 and 16 are schematic views illustrating the operation of the display apparatus shown in FIG. 13.
Figure 15:
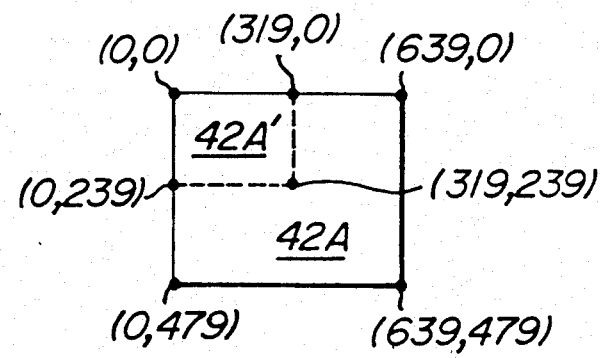

Now the operation of the apparatus according to this embodiment will be explained. It is assumed that the first display screen 41A for displaying the attribute data composed of characters has a dimension of 640×400 pixels as illustrated in FIG. 14, whereas the second display screen 42A for displaying the picture image has a dimension of 640×480 pixels as shown in FIG. 15.

Figure 16:
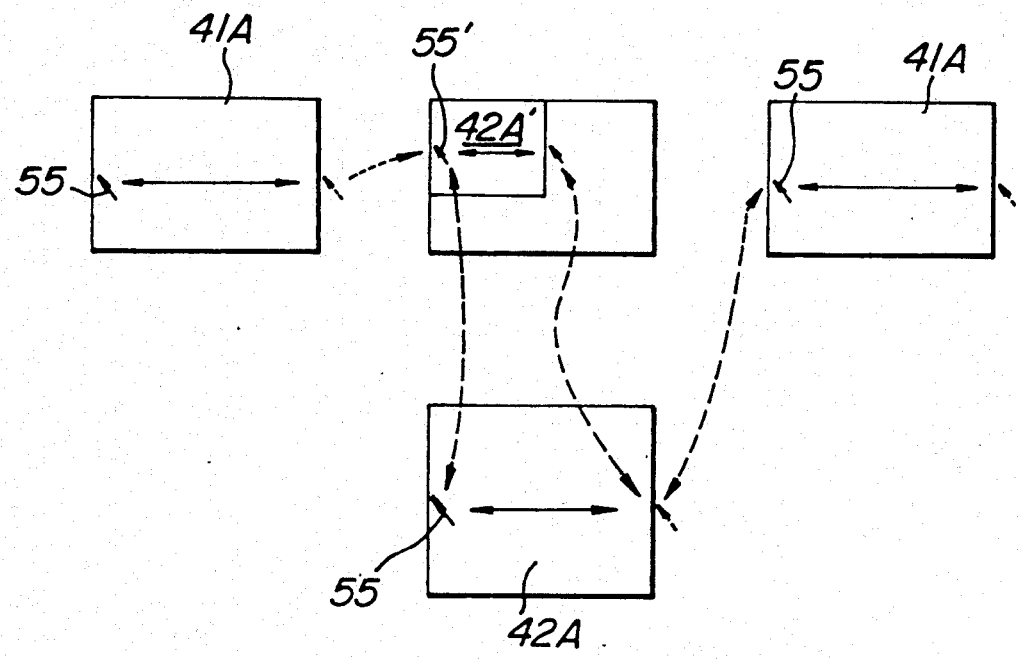

FIG. 16 is a schematic view depicting the movement of the cursor over the first and second display screens 41A and 42A. In the initial condition, the movable range of the cursor on the first display screen 41A is set in the cursor movable range for attribute data setting circuit 49 as horizontal start point (0), horizontal end point (639), vertical start point (0) and vertical end point (399). In the cursor movable range for picture image setting circuit 50, the cursor movable range 42A' which has a dimension equal to the second display screen 42A divided by two in both the horizontal and vertical directions. That is to say the cursor movable range 42A' is defined by horizontal start point (0), horizontal end point (319), vertical start point (0) and vertical end point (239). Further, the cursor mobility for attribute data and cursor mobility for picture image are entered in the cursor mobility setting circuits 46 and 47. In the coordinate converting circuit 53 is entered a ratio of the cursor movable range for attribute data to the cursor movable range for picture image, the value of which in the present case is 2.

In the initial condition, it is assumed that the cursor is displayed on the first display screen 41A at a position denoted by the cursor coordinate detecting circuit 48. In this case, the comparison and control circuit 51 has selected the cursor mobility for attribute data setting circuit 46 and the cursor movable range for attribute data setting circuit 49 and controls the cursor erasing circuit 52 to display the cursor on the first display screen 41A.

When the mouse 43 is moved, the moving distance data is entered into the cursor coordinate detecting circuit 48 which then detects a current position of the cursor in accordance with the entered distance data and the cursor mobility for attribute data supplied from the setting circuit 46. The position data supplied from the cursor coordinate detecting circuit 48 is then supplied to the comparison and control circuit 51 and is compared with the cursor movable range for attribute data supplied from the setting circuit 49. When the cursor is judged to be displayed on the first display screen 41A, the cursor coordinate data is supplied to the first display unit 41 via the cursor erasing circuit 52. In this manner, the cursor 55 can be moved on the first display screen 41A as illustrated in a left-hand block in FIG. 16.

When the mouse 43 is moved further rightward to such an extent that the cursor coordinate detected by the cursor coordinate detecting circuit 48 becomes out of the cursor movable range for attribute data, the cursor 55 is removed from the first screen 41A and is moved into the second display screen 42A as illustrated in FIG. 16. This operation will be explained hereinbelow.

When the horizontal coordinate of the cursor becomes larger than the horizontal end point (639) of the cursor movable range for attribute data, the comparison and control circuit 51 detects this and selects the cursor mobility for picture image setting circuit 47, cursor movable range for picture image setting circuit 50, coordinate converting circuit 53 and cursor coordinate transfer circuit 54. At the same time, the circuit 51 controls the cursor erasing circuit 52 so as to inhibit the display of the cursor on the first attribute data display screen 41A. When the cursor mobility for picture image is selected, the comparison and control circuit 51 sets initial coordinates of cursor of $X_{out}=0$, $Y_{out}=\frac{1}{2} Y_{in}$. That is to say, the reduced cursor movable range 42A' is selected in the cursor movable range for attribute data as shown in FIG. 16. It should be noted that an imaginary cursor 55' in the reduced cursor movable range 42A' is not displayed on the first display screen 41A. Then, the coordinate converting circuit 53 multiplies the coordinate values supplied from the cursor coordinate detecting circuit 48 by two. That is to say, the converting circuit 53 supplies $X_{out} 2=2 \cdot X_{out}$, $Y_{out} 2=2 \cdot Y_{out}$. These converted coordinates $X_{out} 2$; $Y_{out} 2$ are supplied to the second display unit 42 via the cursor coordinate transfer circuit 54 and picture image control unit 45, and the cursor 55 is displayed on the second display screen 42A as shown in a lower block in FIG. 16. It should be noted that the cursor mobility for picture image stored in the circuit 47 should be determined such that when the mouse 43 is moved over a distance, the cursor 55 moved on the second display screen 42A and the cursor moved on the first display screen 41A are moved by the same distance. Therefore, the operator can easily and effectively control the mouse 43.

After the cursor 55 has been removed from the first display screen 41A onto the second display screen 42A, the cursor is moved over the second display screen in the manner explained above, while the cursor coordinates $X_{in}$, $Y_{in}$ detected by the cursor coordinate detecting circuit 48 are changed into $2 \cdot X_{in}$ and $2 \cdot Y_{in}$, respectively.

When the mouse 43 is moved further rightward beyond the horizontal end point of the reduced cursor movable range 42A', the cursor 55 is removed from the second display screen 42A into the first display screen 41A as shown in a right-hand block in FIG. 16. That is to say, when the horizontal coordinate $X_{in}$ supplied from the cursor coordinate detecting circuit 48 exceeds the horizontal end point (319) of the reduced cursor movable range 42A', the comparison and control circuit 51 selects the cursor mobility for attribute data setting circuit 46 and the cursor movable range for attribute data setting circuit 49, and at the same time controls the cursor erasing circuit 52 to display the cursor 55 on the first display screen 41A. Then the cursor coordinate detecting circuit 48 sets initial coordinates of $X_{out}=0$, $Y_{out}=2 \cdot Y_{in}$. When the vertical coordinate $Y_{out}=2 \cdot Y_{in}$ exceeds the vertical end point (399) of the cursor movable range for attribute data, the vertical coordinate $Y_{out}$ is forcedly set to 399.

While the cursor 55 is displayed on the first display screen 41A, when the mouse 43 is moved leftward beyond the horizontal start point (0) of the cursor movable range for attribute data, the cursor 55 is removed from the first display screen 41A into a right-hand side of the second display screen 42A by setting initial coordinates of $X_{out}=319$, $Y_{out}=\frac{1}{2} \cdot Y_{in}$. Then the cursor coordinates are doubled by the coordinate converting circuit 53 to $X_{out} 2=2 \cdot X_{out}$, $Y_{out} 2=2 \cdot Y_{out}$. In this manner, the cursor 55 can be moved on the second display screen 42A.

While the cursor 55 is displayed on the second display screen 42A, when the mouse 43 is moved beyond the cursor movable range for attribute data, the left-hand cursor is removed from the second display screen into a right-hand side of the first display screen 41A by setting initial cursor coordinates of $X_{out}=639$ and $Y_{out}=2 \cdot Y_{in}$. If $2 \cdot Y_{in}$ exceeds the vertical end point 399 of the cursor movable range for attribute data, the vertical coordinate is forcedly set to 399.

When the mouse 43 is moved upward or downward beyond the vertical start point (0) or end point (399) of the cursor movable range for attribute data, the vertical coordinate of the cursor is kept at 0 or 399. Similarly, while the cursor 55 is displayed on the second display screen 42A, the vertical coordinate of the cursor is kept at 0 or 239 even if the mouse 43 is moved beyond the reduced cursor movable range 43A'.

In the present embodiment, even if the display screens have different dimensions, it is possible to move the cursor over these screens with the aid of the single coordinate input device. Further, since the different cursor mobilities are set for the different display screens, the cursor can be moved on both display screens substantially at the same speed in accordance with the movement of the coordinate input device.

The present invention is not limited to the embodiments explained above, but many modifications and alternations may be conceived by those skilled in the art within the scope of the invention. For instance, the number of display units is not limited to two, but more than two display units may be provided. Further, the coordinate input unit may be constructed by various coordinate data entering devices such as a tablet, touch pannel, track ball and keyboard.

What is claimed is:

1. An apparatus for displaying a position indicating mark over a plurality of display screens, comprising:
   first and second display units each having a display screen, said display screens of said first and second display units each having different dimensions;
   a coordinate input unit including a mouse, for entering coordinates of a current position of a position indicating mark displayed on a display screen; and
   a signal processing unit coupled with said display units and coordinate input unit for selecting automatically among said first and second display units a selected display unit which effects a display on the basis of said coordinates entered by said coordinate input unit and for displaying the position indicating mark on the selected display unit;
   said signal processing unit comprising:
   first means for setting a first ratio of movement of the position indicating mark on the first display unit relative to movement of the mouse;
   second means for setting a first range over which the position indicating mark is movable on the first display unit;
   third means for setting a second ratio of movement of the position indicating mark on the second display unit relative to movement of the mouse; and
   fourth means for setting a second range over which the position indicating mark is movable on the second display unit; whereby when the position indicating mark is displayed on the display screen of the first display unit, said first and second setting means are used, while when the position indicating mark is displayed on the display screen, of the second display unit, said third and fourth setting means are used.

2. An apparatus according to claim 1, wherein said second range defined by the fourth means is set within the first range defined by said second means as a range smaller than the first range, and the second display unit has a display screen having a larger dimension than that of a display screen of the first display unit.

3. An apparatus according to claim 2, wherein said signal processing unit further comprises a fifth means for deriving coordinate values of the position indicating mark to be displayed on the display screen of the second display unit by multiplying coordinate values of the position indicating mark defined in said second range by a ratio of the dimension of the display screen of the second display unit to the second range.

4. An apparatus according to claim 1, wherein said second ratio of movement of the position indicating mark defined by the third means is determined such that the position indicating mark is moved on the first and second display units substantially similarly.

5. An apparatus for displaying a position indicating mark over a plurality of display screens, comprising:
   a plurality of display units each having a display screen, said display screens each having different vertical dimensions;
   a coordinate input unit for entering coordinates of a current position of a position indicating mark displayed on a display screen; and
   a signal processing unit coupled with said display units and coordinate input unit for selecting automatically among said plurality of display units a selected display unit which affects a display on the basis of said coordinates entered by said coordinate input unit and for displaying the position indicating mark on the selected display unit, said signal processing unit comprising means for entering coordinates of a current position of the position indicating mark displayed on a display unit;
   wherein each display screen of said display units is divided into sub-areas of substantially the same construction, such that information distinct from and associated with respective sub-areas of one of said display screens is displayed in corresponding sub-areas of each of the remaining display screens, wherein any one of said sub-areas may be denoted from any one of the display units.

6. The apparatus of claim 5, wherein when a content of said denoted sub-area of a display screen is changed, said distinct and associated information displayed in corresponding areas of other display units is simultaneously changed.

* * * * *